(12) United States Patent
Leavitt

(10) Patent No.: US 11,502,495 B2
(45) Date of Patent: Nov. 15, 2022

(54) UTILITY CONDUIT

(71) Applicant: Aqseptence Group, Inc., New Brighton, MN (US)

(72) Inventor: Clarence Leavitt, Forked River, NJ (US)

(73) Assignee: Aqseptence Group, Inc., New Brighton, MN (US)

( * ) Notice: Subject to any disclaimer, the term of this patent is extended or adjusted under 35 U.S.C. 154(b) by 383 days.

(21) Appl. No.: 16/492,507

(22) PCT Filed: Mar. 12, 2018

(86) PCT No.: PCT/US2018/021998
§ 371 (c)(1),
(2) Date: Sep. 9, 2019

(87) PCT Pub. No.: WO2018/165658
PCT Pub. Date: Sep. 13, 2018

(65) Prior Publication Data
US 2021/0135442 A1    May 6, 2021

Related U.S. Application Data

(60) Provisional application No. 62/469,892, filed on Mar. 10, 2017.

(51) Int. Cl.
*F16L 37/00* (2006.01)
*H02G 9/06* (2006.01)
*H02G 3/06* (2006.01)

(52) U.S. Cl.
CPC ............. *H02G 9/06* (2013.01); *F16L 37/00* (2013.01); *H02G 3/0616* (2013.01)

(58) Field of Classification Search
CPC ....... H02G 9/06; H02G 3/0616; F16L 37/148; F16L 1/036; F16L 2201/10; F16L 25/10
See application file for complete search history.

(56) References Cited

U.S. PATENT DOCUMENTS 3,606,402 A * 9/1971 Medney ................ F16L 37/148
285/305
3,759,553 A * 9/1973 Carter .................. F16L 37/148
285/260

(Continued)

OTHER PUBLICATIONS

PCT International Preliminary Report on Patentability for International Application No. PCT/US2018/021998, dated Sep. 19, 2019, 9 pages.

(Continued)

*Primary Examiner* — Benjamin F Fiorello
(74) *Attorney, Agent, or Firm* — Patterson Thuente Pedersen, P.A.

(57) ABSTRACT

A utility conduit and related methods of assembling lengths of utility conduit with a mechanical spline connector. The utility conduit includes opposed male and female ends, wherein the male end is slidably insertable into the female end of adjacent conduits. The female end includes one or more circumferential sealing channels into which a seal member is positionable and an internal spline groove that is circumferentially defined inside the conduit. The female end includes a wall bore through a conduit wall that intersects with the internal spline groove. The male end includes an exterior spline groove on an exterior of the conduit. A spline can be inserted through the wall bore and into a space cooperatively defined by the internal spline groove and the external spline groove. The spline is inserted such that the spline occupies the space cooperatively defined by the internal spline groove and the external spline groove.

12 Claims, 10 Drawing Sheets

(56) References Cited

U.S. PATENT DOCUMENTS

| | | | | |
|---|---|---|---|---|
| 4,269,436 A * | 5/1981 | Medney | ................ | F16L 37/148 |
| | | | | 285/179 |
| 4,679,825 A * | 7/1987 | Taylor | ................... | F16L 37/148 |
| | | | | 285/93 |
| 5,255,945 A * | 10/1993 | Toon | ..................... | F16L 37/148 |
| | | | | 285/305 |
| 5,813,705 A * | 9/1998 | Dole | ................... | F16L 37/0987 |
| | | | | 285/321 |
| 6,343,813 B1 * | 2/2002 | Olson | ................... | F16L 37/148 |
| | | | | 285/305 |
| 6,913,293 B1 * | 7/2005 | Filer | ..................... | F16L 37/148 |
| | | | | 285/305 |
| 6,921,114 B1 * | 7/2005 | Washburn | ............... | F16L 25/10 |
| | | | | 285/305 |
| 2003/0234536 A1 | 12/2003 | Riedy et al. | | |
| 2014/0182732 A1 | 7/2014 | Coogan et al. | | |
| 2017/0021723 A1 | 1/2017 | Visarius et al. | | |

OTHER PUBLICATIONS

PCT International Search Report and Written Opinion of the International Searching Authority for corresponding International Application No. PCT/US2018/021998, dated May 29, 2018; 13 pages.

\* cited by examiner

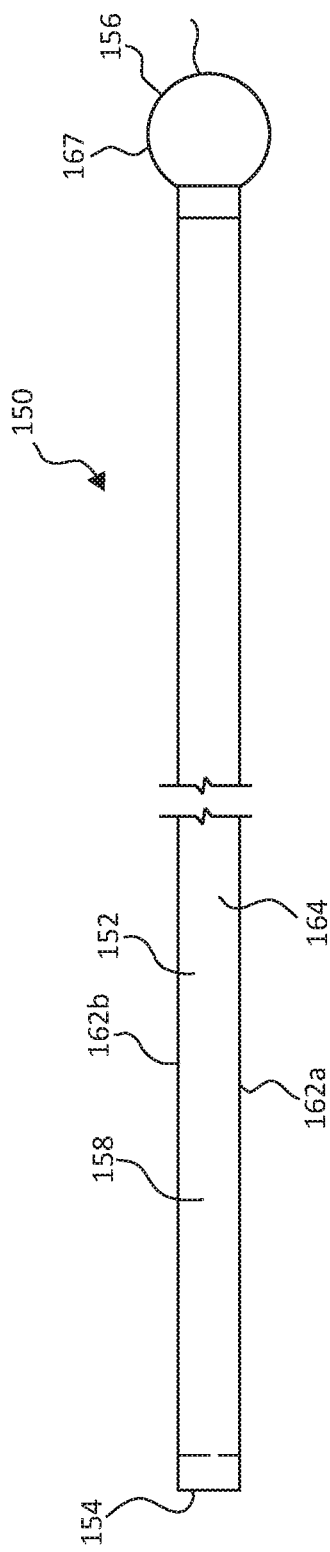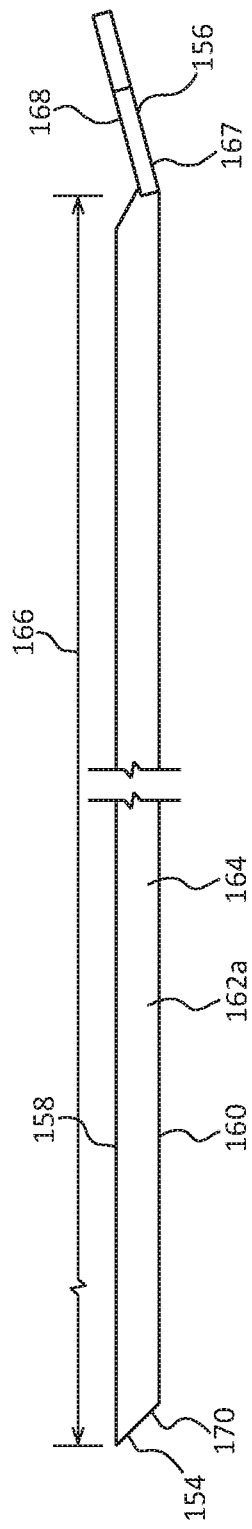

UTILITY CONDUIT

PRIORITY CLAIM

The present application is a National Phase entry of PCT Application No. PCT/US2018/021998, filed on Mar. 12, 2018, which claims priority to U.S. Provisional Application Ser. No. 62/469,892 filed Mar. 10, 2017 and entitled "UTILITY CONDUIT", both of which are hereby incorporated by reference in their entirety.

TECHNICAL FIELD

The present invention is directed to polymeric conduit for use in protecting buried utility cables and wires. More specifically, the present invention is directed to polymeric conduit having male and female ends, whereby a mechanical connection is established between adjacent lengths of conduit using an externally introduced spline connector.

BACKGROUND

In the past, conventional construction techniques involved using poles to suspend and hang utility wires, for example, electrical and telephone wires, along roadways and other right of ways. Ultimately, these hung wires would be connected to utility consumers, for example, businesses or residential addresses, through a mast or similar connector on a building. While these hung and suspended wires were successful in delivery utilities to a point of use, they suffered from their exposure to the environment and weather. For example, high winds, tornados and freezing conditions could lead to wires being blown down directly or by having nearby trees fall across them. In extreme circumstances, these events could lead to a loss of utilities for days or even weeks.

In order to reduce the potential for these outages, modern construction techniques have evolved that allow utility wires to be buried rather than hung. In addition to avoiding the potential for weather related outages, burying utility wires provides aesthetic benefits in that wires and transmission poles are no longer eyesores in neighborhoods or along roadways. In order to protect these buried wires and cables, these cables are typically contained within lengths of connected conduit. In order to avoid corrosion, the conduit can be fabrication of polymeric materials.

One disadvantage of using polymeric conduit with buried cables is that many of the conventional connection techniques require the use of chemical bonding agents and solvents. As such, it would be beneficial to have polymeric conduit that uses an alternative connecting technique that reduces connection time and avoid any time delay in waiting for chemical agents to bond or otherwise cure.

SUMMARY

A utility conduit of the present invention overcomes the deficiencies of the prior art through the use of a mechanical spline connector to positively connect adjacent lengths of conduit. With the conduit of the present invention, connections between lengths of conduit require no chemical curing or bonding and are easily disassembled as well.

In one aspect, a representative utility conduit of the present invention can comprise a length of conduit formed from a polymeric material and having opposed male and female ends. Generally, the female end is dimensioned such that the male end of an adjacent length of conduit is slidably insertable into the female end. Generally, the female end includes one or more circumferential sealing channels into which a seal member, for example, an o-ring seal is positionable. Between the circumferential sealing channels and a female open end is an internal spline groove that is circumferentially defined within the interior of the conduit. The female end can further comprise a wall bore through a conduit wall that intersects with the internal spline groove. The male end can include an exterior spline groove on an exterior of the conduit. As such, when the male end of a first length of conduit is fully inserted into a female end of a second length of conduit, the one or more seal members provide a fluid-tight seal between the first and second lengths of conduit and the internal spline groove and external spline groove are aligned such that the external spline groove is visible through the wall bore. A spline can be inserted through the wall bore and into a space cooperatively defined by the internal spline groove and the external spline groove. The spline can be fully inserted such that the spline circumferentially occupies the space cooperatively defined by the internal spline groove and the external spline groove. When the spline has been fully inserted, a tab on the spline can be positioned and reside within the wall bore. Should a user wish to disassemble the connected lengths of conduit, the user merely grabs the tab, pulls the spline out the wall bore and then withdraws the male end from the female end.

In another aspect, the present invention is directed to a method of coupling adjacent lengths of utility conduit. The method can comprise a step of positioning a male end of a first length of conduit proximate a female end of a second length of conduit. The method can further comprise positioning one or more seal members, for example, o-ring seals within circumferential sealing channel defined within an interior portion of the female end. The method can further comprise inserting the male end into the female end such that the seal members created a fluid-tight seal between an interior wall of the female end and an exterior wall of the male end. The method can further comprise advancing the male end into the female end until an external circumferential spline groove on the male end is aligned with an internal circumferential spline groove on the female. In some embodiments, confirmation of the alignment of the external circumferential spline groove with the internal circumferential spline groove is verified by viewing the external circumferential spline groove through a wall bore in the second length of conduit that intersects with the internal circumferential spline groove. The method further comprises introducing a spline through the wall bore and into a cooperatively defined space defined by the internal and external circumferential spline grooves. The spline is circumferentially advanced through the cooperatively defined space. A tab on the spline can be positioned within the wall bore when the spline has been fully, circumferentially advanced. In some embodiments, the method can further comprise disassembly the first and second lengths of conduit by grasping the tab and withdrawing the spline from the cooperatively defined space. At that point, the male end can be withdrawn from the female end to complete disassembly of the first and second lengths of conduit.

In another aspect, the present invention is directed to a polymeric utility conduit having a conduit body defined between a male end and a female end. The male end can include an external circumferential spline groove. The female end can include an internal circumferential spline groove. The conduit body can further comprise a wall bore defined between an external body wall and the internal circumferential groove. The external circumferential groove can include a groove color that is selected to be visually distinguishable from a conduit color on the remainder of the conduit body.

The above summary is not intended to describe each illustrated embodiment or every implementation of the subject matter hereof. The FIG.s and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying FIG.s, in which:

FIG. 5 is a plan view of a spline according to a representative embodiment of the present invention.

FIG. 6 is a side view of the spline of FIG. 5.

Figure 1:
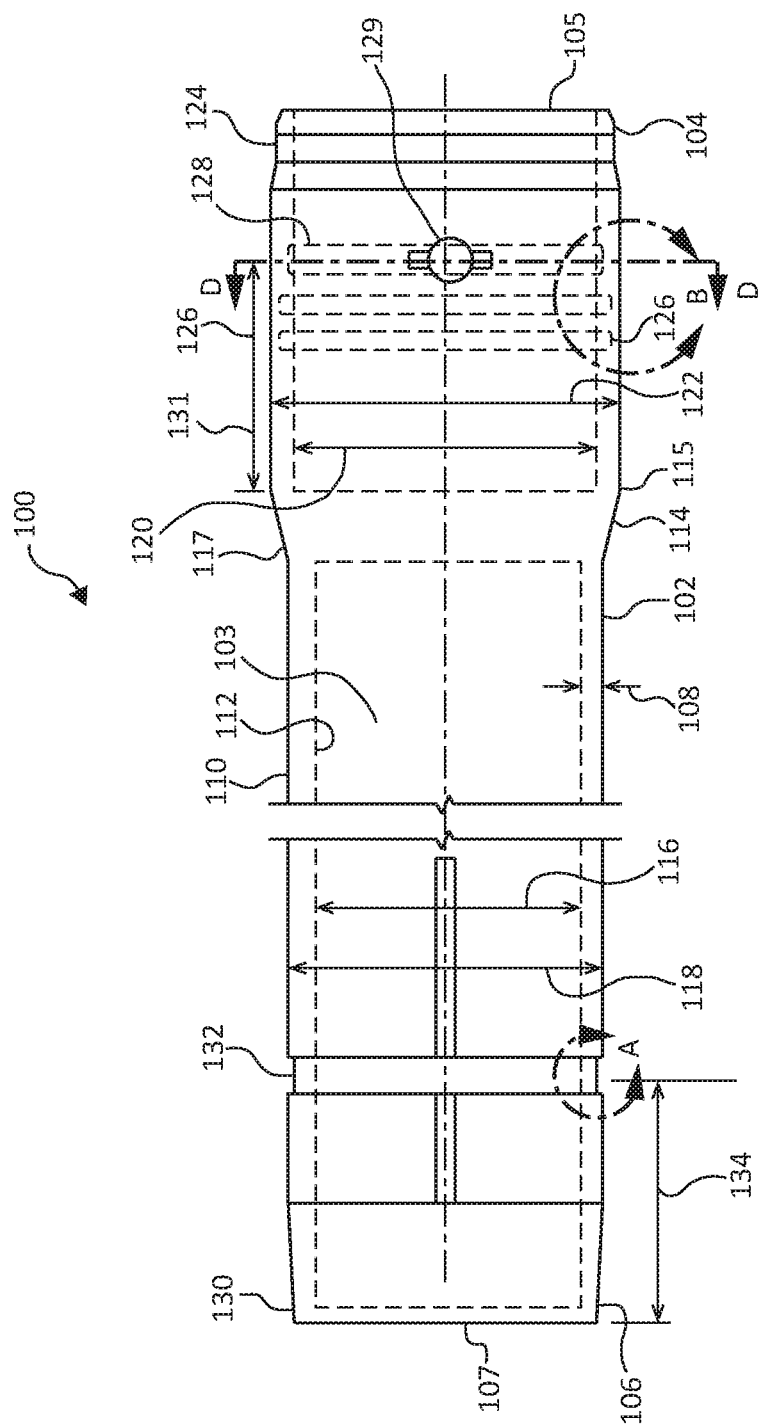
FIG. 1 is a partially hidden, side view of a length of conduit according to a representative embodiment of the present invention.
Figure 2:
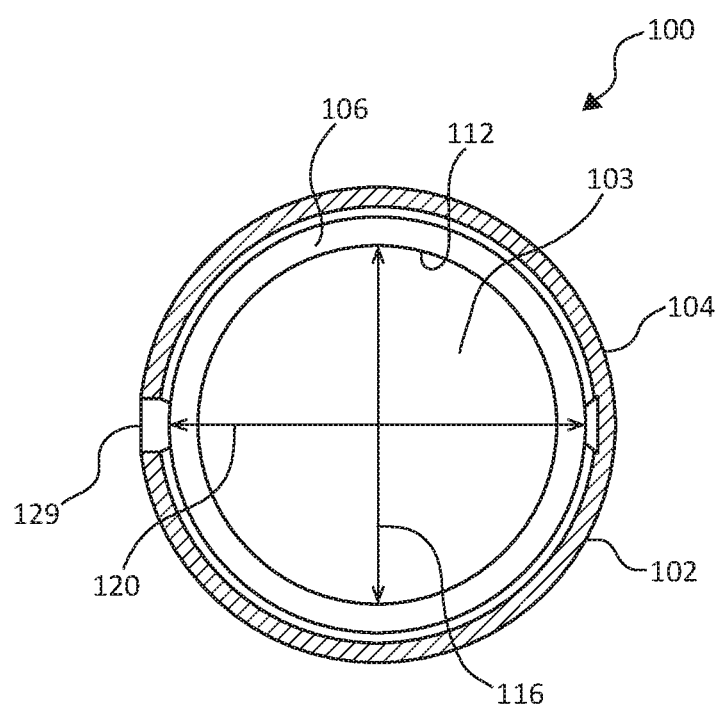
FIG. 2 is a section view of the length of conduit of FIG. 1 taken a line D-D of FIG. 1.
Figure 3:
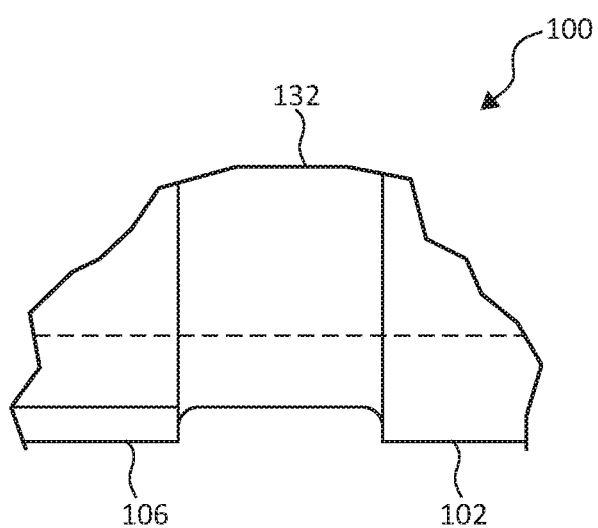
FIG. 3 is a detailed side view of the length of conduit of FIG. 1 taken at Detail A of FIG. 1.
Figure 4:
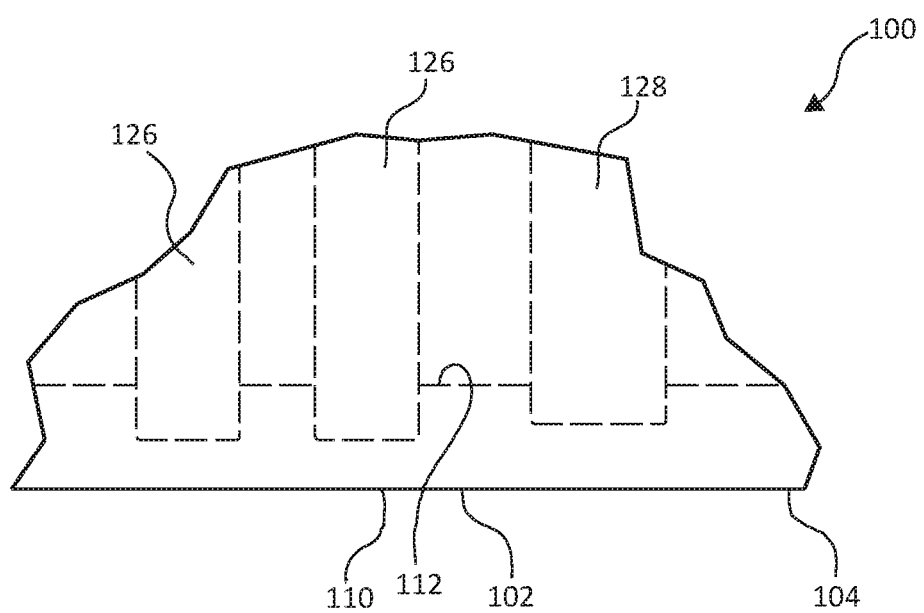
FIG. 4 is a detailed side view of the length of conduit of FIG. 1 taken at Detail B of FIG. 1.
Figure 7:
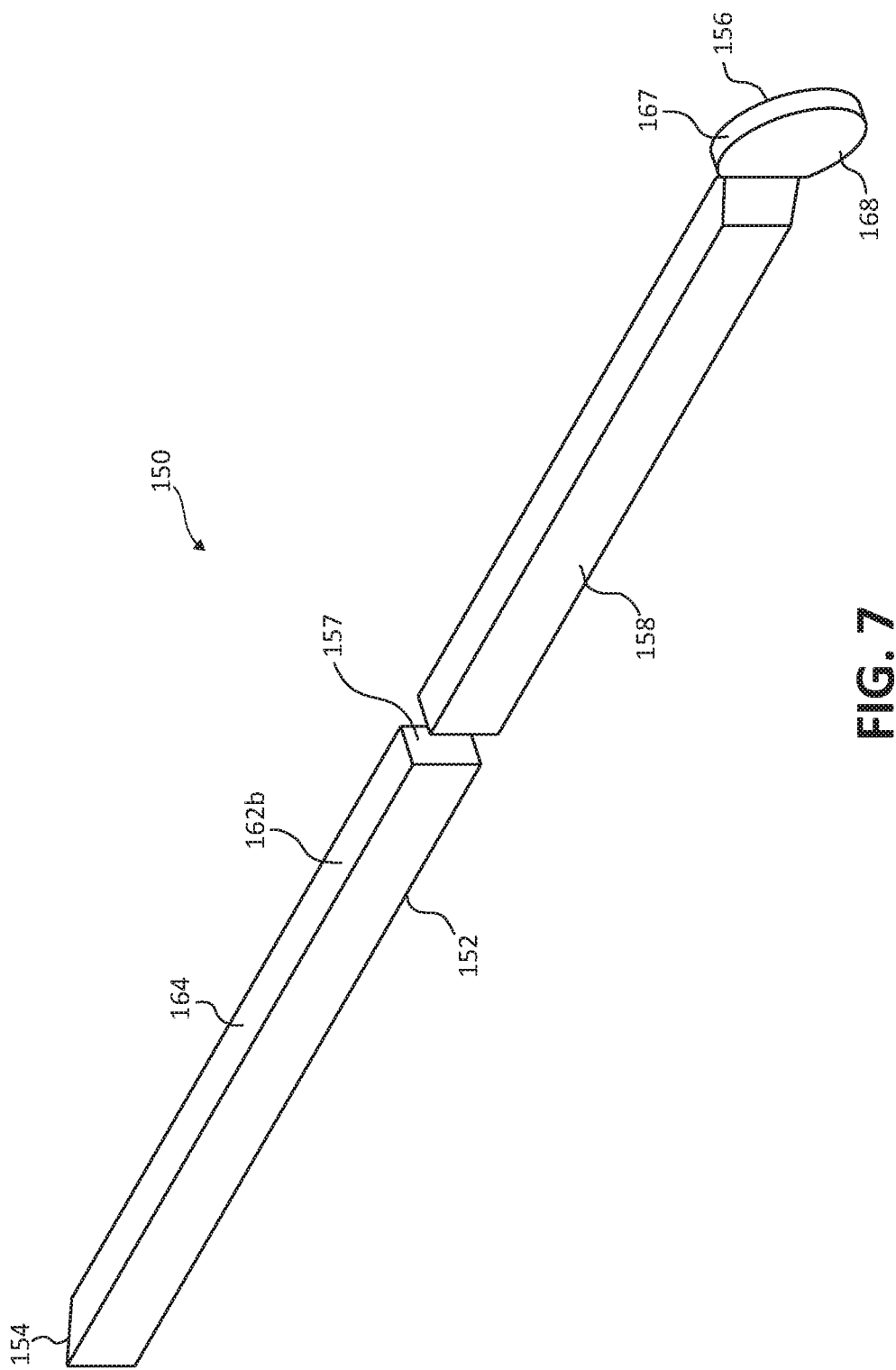
FIG. 7 is a perspective view of the spline of FIG. 5
Figure 8:
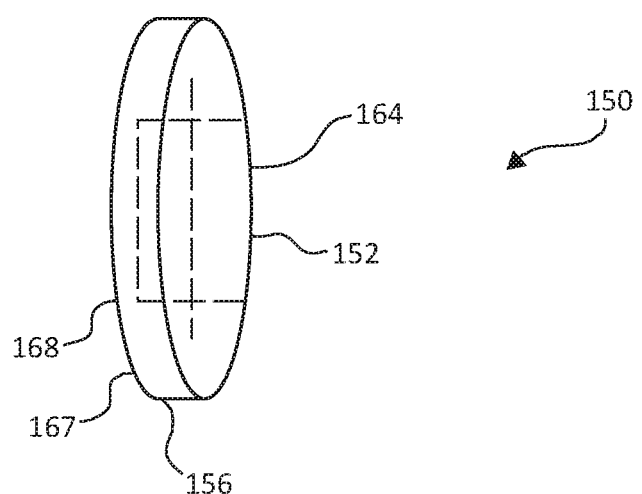
FIG. 8 is an end view of the spline of FIG. 5.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

As illustrated in FIGS. 1-4, a length of conduit 100 according to a representative embodiment of the present invention can comprise a conduit body 102 having a female end 104 and a male end 106. Conduit body 102 generally defines a conduit channel 103 that extends continually between a female opening 105 defined at the female end 104 and a male opening 107 defined at the male end 106. Generally, the conduit body 102 has a body wall thickness 108 defined by an outer body surface 110 and inner body surface 112. Conduit body 102 is generally fabricated of a single material and can be formed of suitable polymeric materials including, for example, polyvinyl chloride (PVC), high density polyethylene (HDPE), fiberglass and other suitable polymers.

With further reference to FIGS. 1-4, the conduit body 102 further includes an angled portion 114 that is located proximate the female end 104. Within the conduit channel 103, the angled portion 114 is defined between a leading edge 115 and a trailing edge 117 with the terms "leading" and "trailing" referencing location relative to the female opening 105. Between the trailing edge 117 and the male opening 107, the conduit body 102 generally has an inner diameter 116 and outer diameter 118. Between the leading edge 115 and the female opening 105, the conduit body 102 has a female inner diameter 120 and a female outer diameter 122. Female inner diameter 120 is larger than inner diameter 116 and generally, female inner diameter 120 is slightly larger than the outer diameter 118 so as to facilitate insertion and connection of male and female ends on adjacent lengths of conduit 100 as will be described in further detail below. Female end 104 can comprise a rounded or tapered surface 124 so as to reduce edges that can catch on soil or rocks and to reduce friction as conduit 100 is placed into and/or slid within excavations or trenches during installation. Between the leading edge 115 and the female opening 105, one or more sealing channels 126 are circumferentially defined in the inner body surface 112. An interior spline groove 128 is circumferentially defined in the inner body surface 112 at a position between the sealing channels 126 and the female opening 105. A wall bore 129 is defined through the conduit body 102 so as to expose and provide access to the interior spline groove 128 from the outer body surface 102. Wall bore 129 is located at a bore distance 131 measured from the leading edge 115.

Referencing FIGS. 1-4, male end 106 generally comprise a tapered portion 130 in the outer body surface 110 proximate the male opening 107 so as to facilitate introduction of the male end 106 into the female end 104 of an adjacent length of conduit 100 as will be described further below. Proximate male end 106, the conduit body 102 includes an exterior spline groove 132 defined in the outer body surface 100. Exterior spline groove 132 is located at a groove distance 134 measured from the male opening 107. In order to facilitate proper connection and retention, groove distance 134 is selected so as be substantially equivalent to the bore distance 131.

As seen in FIGS. 5, 6, 7 and 8, a representative spline 150 generally comprises a spline body 152 including an insertion end 154 and a manipulation end 156. The spline body 152 can comprise a square or rectangular cross-section 157 defined by a top surface 158, a bottom surface 160 and a pair of side surface 162a, 162b. The spline body 152 generally comprises a retention portion 164 having a retention length 166 and a manipulation portion 167. Manipulation portion 167 can comprise an angled tab 168 or similar feature that promotes grabbing or coupling. Insertion end 154 can define an angled surface 170. The spline 150 is generally fabricated of a flexible polymeric material such as, for example, nylon and similar ductile materials.

In use, adjacent lengths of the conduit 100 are generally positioned in line with one another such that the male end 106 of a first conduit 100 is proximate the female end 104 of a second conduit 100. Next, an o-ring seal 204 is positioned within each of the sealing channels 126. With the help of the tapered portion 130, the male end 106 of the first conduit 100 is slidingly introduced and inserted into the female opening 105 of the second conduit 100. The male end 106 is fully advanced into the female opening 105 until the male end 106 comes into contact with the leading edge 115 of the second conduit 100 and further introduction of the male end 106 is prevented as the female inner diameter 120 of the second conduit 100 decreases at the angled portion 114. With the male end 106 of the first conduit 100 advanced fully into the female end 104 of the second conduit 100, each o-ring seal 204 engages the outer body surface 112 of the first conduit 100 so as to create a fluid-tight connection between the first conduit 100 and the second conduit 100.

Figure 9:
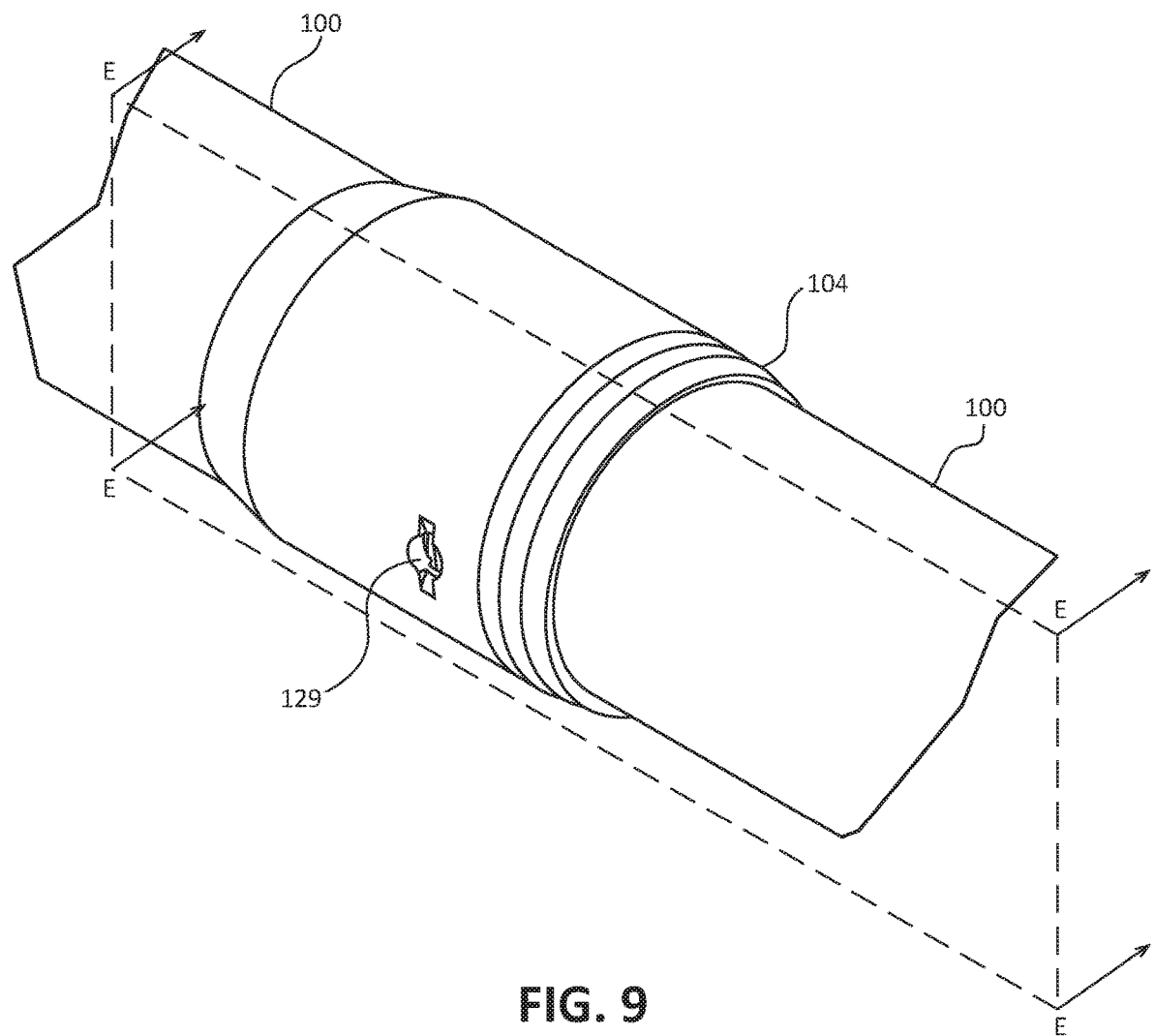
FIG. 9 is a perspective view of a first length of conduit inserted into a second length of conduit according to a representative embodiment of the present invention.
Figure 10:
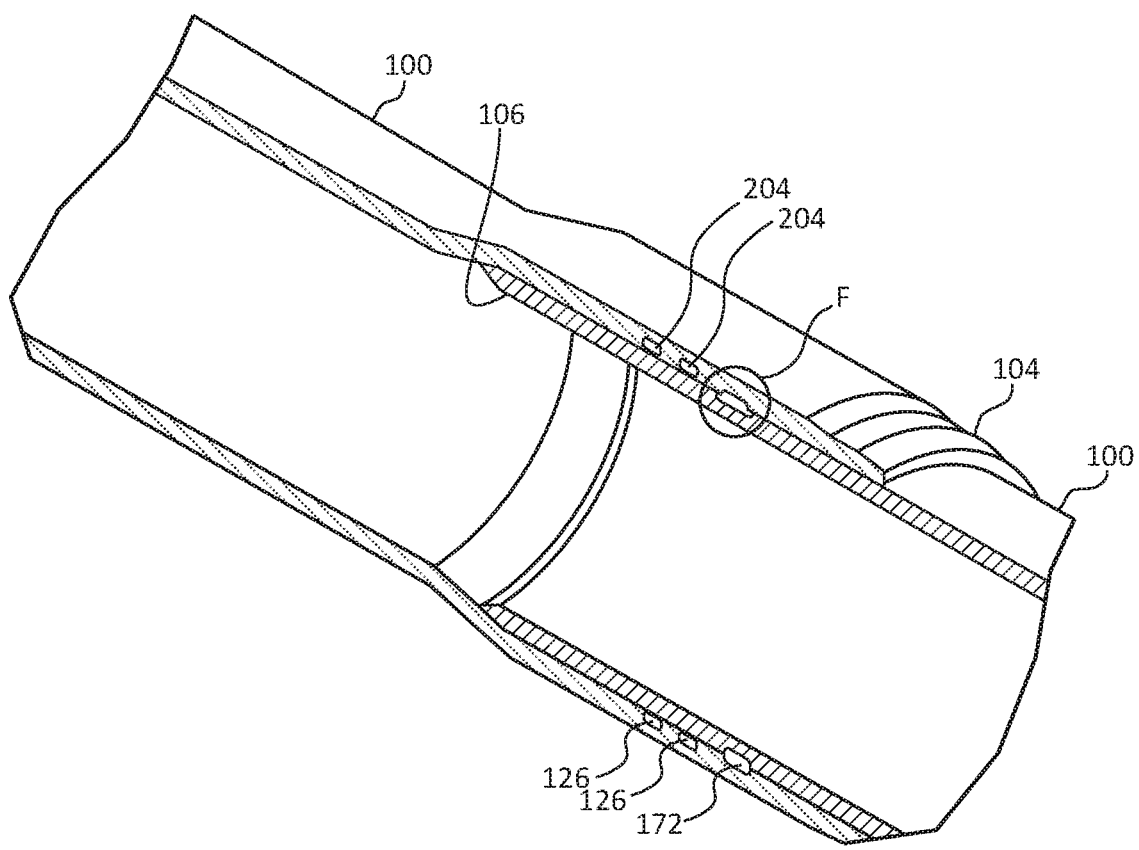
FIG. 10 is a perspective section view of the first length of conduit inserted into the second length of conduit of FIG. 9 along the plane defined by E-E.
Figure 11:
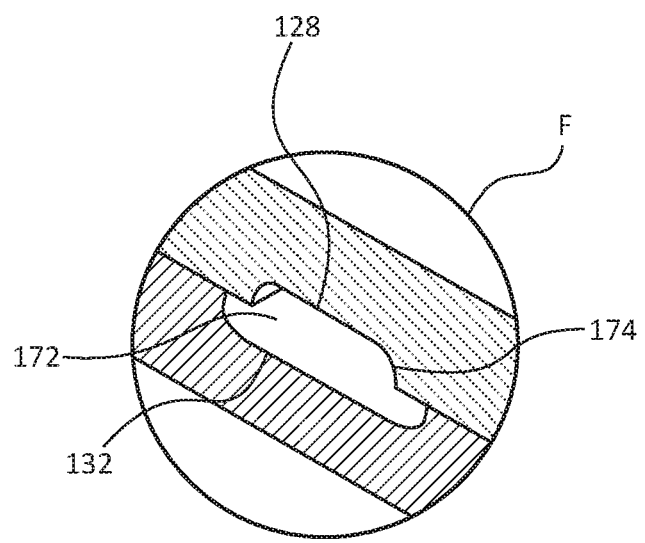
FIG. 11 is a detailed perspective section view of the first length of conduit inserted into the second length of conduit of FIG. 9 taken at Detail F of FIG. 10.

With the male end 106 of the first conduit 100 fully inserted into the female end 104 of the second conduit 100 as shown in FIGS. 9-11, the wall bore 129 of the second conduit 100 will be positioned directly over the exterior spline groove 132 of the first conduit 100. In some embodiments, the exterior spline groove 132 can include a color different from the conduit body 102 such that the color is visible through the wall bore 129 so as to confirm proper alignment of the interior spline groove 128 on the second conduit 100 with the exterior spline groove 132 on the first conduit 100. When the exterior spline groove 132 is aligned with the interior spline groove 128, a combined circumferential spline groove 172 is continually circumferentially defined by the first and second conduits 100.

With the interior spine groove 128 aligned with the exterior spline groove 132, a user can then slidably introduce the insertion end 154 of the spline 150 through the wall bore 129 such that the insertion end 154 enters into the combined circumferential spline groove 172 as continually circumferentially defined by the interior spline groove 128 and the exterior spline groove 132. Using the manipulation portion 167, the user continues to advance the spline body 152 through the wall bore 129 such that the insertion end 154 is advanced circumferentially through the combined circumferential spline groove 172. The retention length 166 is preferably selected to equal the circumferential length of the combined circumferential spline groove 172. As such, the insertion end 154 travels circumferentially around the combined circumferential spline groove 172 and approaches the wall bore 129. At that point, the angled tab 168 can be snapped into and reside with the wall bore 129. Preferably, the square or rectangular cross-section 157 of the spline body 152 matches a combined cross-section 174 of the combined circumferential spline groove 172 as continually, circumferentially defined by the interior spline groove 128 and the exterior spline groove 132, such that the spline 150 positively couples the male end 106 of the first conduit 100 within the female end 104 of the second conduit 100. Attachment of the male end 106 to the female end 104 can be repeated for each length of conduit 100 so as to couple any number of adjacent conduits together. To disassemble the conduit, a user simply grasps the angled tab 168 by hand or with an appropriate tool and pulls the spline 150 out of the combined circumferential spline groove 172 defined by the interior spline groove 128 and the exterior spline groove 132. Following removal of the spline 150, a user can simply pull the male end 106 from the corresponding female end 104 to complete disassembly of adjacent lengths of conduit 100.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

The invention claimed is:

1. A utility conduit system, comprising:
a first polymeric conduit having a male end, the male end including an external circumferential spline groove;
a second polymeric conduit having a female end, the female end including an internal circumferential spline groove, the second conduit further including a wall bore in communication with the internal circumferential spline groove; and
a spline member having a retention portion and a manipulation portion, said manipulation portion defining a tab,
wherein the male end is configured for slidable insertion into the female end such that the external circumferential spline groove is aligned with the internal circumferential spline groove to define a combined circumferential spline groove,
wherein the retention portion is configured for insertion into the wall bore such that the retention portion fills the combined circumferential spline groove so as to couple the first polymeric conduit to the second polymeric conduit; and
wherein the tab snaps into and resides with the wall bore when the retention portion fills the combined circumferential spline groove.

2. The utility conduit system of claim 1, wherein the female end further comprises an internal circumferential sealing groove and wherein a sealing member is configured or mounting within the internal circumferential sealing groove such that the sealing member sealing engages the first polymeric conduit when the first conduit is coupled to the second polymeric conduit.

3. The utility conduit system of claim 1, wherein the first polymeric conduit comprises a conduit color and wherein the external circumferential spline groove comprises a spline groove color that is selected to be different than the conduit color such that the spline groove color is visible through the wall bore when the external circumferential spline groove is aligned with the internal circumferential spline groove.

4. The utility conduit system of claim 1, wherein the retention portion defines a retention length and the combined circumferential spline groove defines a combined circumferential spline groove length, wherein the retention length is equal to the combined circumferential spline groove length.

5. The utility conduit system of claim 1, wherein the tab is configured for grasping to remove the retention portion from the combined circumferential spline groove so as to decouple the first polymeric conduit from the second polymeric conduit.

6. The utility conduit system of claim 1, wherein the retention portion defines a spline cross-sectional area and the combined circumferential spline groove defines a combined spline groove cross-sectional area and wherein the spline cross-sectional area matches the combined circumferential spline groove cross-sectional area.

7. A method for connecting utility conduit, comprising:
inserting a male end of a first polymeric conduit into a female end of a second polymeric conduit;
aligning an external circumferential spline groove on the male end with an internal circumferential spline groove on the female end to form a combined circumferential spine groove, said alignment being confirmed by visually identifying the external circumferential spline groove through a wall bore on the second polymeric conduit, said wall bore in communication with the internal circumferential spline groove;
inserting a retention portion of a spline member through the wall bore such that retention portion occupies the combined circumferential spline groove; and
snapping a tab on a manipulation portion of the spline member into the wall bore such that the tab resides within the wall bore.

8. The method of claim 7, further comprising:
sealing the first polymeric conduit and second polymeric conduit by mounting a sealing member in an internal circumferential sealing groove on the female end, whereby said sealing member engages the first polymeric conduit when the male end is inserted into the female end.

9. The method of claim 7, wherein aligning the external circumferential spline groove with the internal circumferential spline groove includes visually identifying a spline groove color on the external circumferential spline groove that is different than a conduit color of the first polymeric conduit.

10. The method of claim 7, wherein the retention portion defines a retention cross-sectional area and the combined circumferential spline groove defines a combined spline groove cross-sectional area and wherein the retention cross-sectional area matches the combined spline groove cross-sectional area.

11. The method of claim 10, wherein the retention portion defines a retention length and the combined circumferential spline groove defines a combined spline groove length and wherein the retention length equals the combined spline groove length.

12. The method of claim 7, further comprising:
decoupling the first polymeric conduit from the second polymeric conduit by grasping the tab and removing the tab from within the wall bore whereby the retention portion is withdrawn from the combined circumferential spline groove.

* * * * *